United States Patent [19]

Ueno et al.

[11] Patent Number: 4,683,130
[45] Date of Patent: Jul. 28, 1987

[54] METHOD OF GENERATING OXYGEN FOR EMERGENCY USE

[76] Inventors: Shinji Ueno, 4-10-9, Tsuboi, Kumamoto-ski, Kumamoto-ken; Naoki Koga, 207, 5-22-31, Hirao, Chuoh-ku, Fukuoka-shi, Fukoka-ken, both of Japan

[21] Appl. No.: 846,077

[22] Filed: Mar. 31, 1986

[30] Foreign Application Priority Data

Apr. 2, 1985 [JP] Japan .................................. 60-68375

[51] Int. Cl.$^4$ ............................................ C01B 13/00
[52] U.S. Cl. .................................................... 423/579
[58] Field of Search ........................................ 423/579

[56] References Cited

U.S. PATENT DOCUMENTS 3,856,709  12/1974  Porta et al. ........................ 502/527
4,508,700  4/1985  Hoshiko ............................ 423/579
4,620,970  11/1986  Sumumori et al. ................ 423/579

Primary Examiner—John Doll
Assistant Examiner—Wayne A. Langel
Attorney, Agent, or Firm—Cushman, Darby & Cushman

[57] ABSTRACT

A method of generating oxygen for emergency use wherein oxygen is generated by adding a catalyst such as manganese dioxide etc. to an aqueous solution prepared by intermixing an addition compound of sodium carbonate and hydrogen peroxide with water and wherein the catalyst is formed into a continuous and integral shape so as to thereby make it possible to put the catalyst into and take it out of the aqueous solution so that generation of oxygen can be started and stopped easily.

19 Claims, 3 Drawing Figures

METHOD OF GENERATING OXYGEN FOR EMERGENCY USE

BACKGROUND OF THE INVENTION (a) Field of the Invention

The present invention relates to a method of generating oxygen for emergency use wherein an addition compound of sodium carbonate and hydrogen peroxide ($2Na_2CO_3 \cdot 3H_2O_2$) is employed.

(b) Description of the Prior Art

One's life is sometimes endangered by oxygen starvation at the time of escape from a fire. In such a case, a supply of oxygen is needed. Besides, when poisonous gases are generated at the time of fire, it is necessary to wear a poisonous gas-adsorbing mask which contains active carbon. Thus, it is possible to escape danger. For this particular purpose, it is desired to have an oxygen-generating means which is light in weight and handy to carry around and which can produce oxygen by a simple operation. A handy oxygen-generating means is demanded also in a case in which oxygen inhalation is urgently needed when a person gets sick suddenly.

As an oxygen-generating method applicable to such oxygen-generating means, a method may be considered wherein an addition compound of sodium carbonate and hydrogen peroxide is intermixed with water in the presence of a catalyst so as to generate oxygen. When 2 mols of the addition compound of sodium carbonate and hydrogen peroxide is intermixed with water in the presence of a catalyst, 48 g of oxygen is generated through a chemical reaction as shown by the following chemical reaction formula:

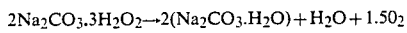

This reaction takes place as follows. When the addition compound of sodium carbonate and hydrogen peroxide is intermixed with water, the addition compound is decomposed into sodium carbonate and a hydrogen peroxide solution. The hydrogen peroxide solution is then decomposed by the catalyst into water and oxygen. This reaction takes place drastically and, moreover, causes generation of heat. Consequently, depending on the amounts of water and catalyst used, the temperature instantaneously jumps to 100° C. causing bumping. Oxygen and vapor are released simultaneously, and the reaction is completed in a very short space of time. This is not desirable for an oxygen supplying method for cases of accident and sudden illness in which a supply of oxygen is demanded continuously at a constant rate for a certain period of time.

Therefore, in order to generate oxygen in an amount needed for emergency inhalation constantly for a predetermined length of time from an addition compound of sodium carbonate and hydrogen peroxide of an amount that is conveniently carried around and usable in emergencies.

It is necessary to check the drastic generation of oxygen and control the reaction so that oxygen is generated at a constant rate for a predetermined period of time. For this particular purpose, it is necessary to add water and a catalyst to the addition compound of sodium carbonate and hydrogen peroxide little by little and slowly by controlling the amounts of water and catalyst to be added while observing the amount of oxygen being generated. In case of emergency, however, it is practically impossible to get a supply of oxygen by making the above-mentioned control.

As a method of generating oxygen contrived in order to eliminate the above-mentioned disadvantage, it is known to form a catalyst into a plural number of solid bodies each with a different dissolving speed and to add water to a mixture of said solid bodies of the catalyst and addition compound of sodium carbonate and hydrogen peroxide so that the afore-mentioned chemical reaction is thereby caused and oxygen is generated. In said known method of generating oxygen, the solid bodies each with a different dissolving speed is prepared by binding the catalyst with gum arabic solutions or polyvinyl alcohol solutions each with a different concentration, and water is added to a mixture of said solid bodies and addition compound of sodium carbonate and hydrogen peroxide so that oxygen is thereby generated at a constant rate for a long period of time.

By said known method of generating oxygen, it is possible to get a supply of oxygen stably at a constant rate for a certain period of time. However, said known method of generating oxygen has a disadvantage that it is impossible to vary the amount of oxygen to be generated at a time. Besides, said known method of generating oxygen has a disadvantage that, when once used, it is impossible to use the aqueous solution of the addition compound of sodium carbonate and hydrogen peroxide, catalyst, etc. again.

SUMMARY OF THE INVENTION

It is, therefore, a primary object of the present invention to provide a method of generating oxygen for emergency use wherein oxygen is generated by putting a catalyst such as manganese dioxide, which is formed into a continuous and integral body such as a wire, coil, plate, etc., into an aqueous solution prepared by intermixing water with an addition compound of sodium carbonate and hydrogen peroxide so that a chemical reaction to decompose the hydrogen peroxide solution into water and oxygen takes place and oxygen is thereby generated and wherein generation of oxygen is stopped by removing said catalyst from said aqueous solution and thereby stopping said chemical reaction.

Another object of the present invention is to provide a method of generating oxygen for emergency use arranged that oxygen is generated stably at a constant rate for an extended period of time by removing oxygen bubbles which are formed as oxygen is generated and which cling to the catalyst surface.

Still another object of the present invention is to provide a method of generating oxygen for emergency use arranged that, as a means for removing the oxygen bubbles which cling to the catalyst surface, the catalyst is heated so that the aqueous solution near the catalyst causes convection due to a temperature difference.

Still another object of the present invention is to provide a method of generating oxygen for emergency use arranged that the rate of oxygen generation is controlled by varying the temperature of the catalyst and thereby varying the temperature of the aqueous solution near the catalyst surface.

Still another object of the present invention is to provide a method of generating oxygen for emergency use arranged that, as a means for removing the oxygen bubbles which cling to the catalyst surface, the aqueous solution near the catalyst is stirred so that flow is caused in the aqueous solution.

Still another object of the present invention is to provide a method of generating oxygen for emergency use arranged that, as a means for removing the oxygen bubbles which cling to the catalyst surface, the catalyst is rotated or vibrated in the aqueous solution.

Still another object of the present invention is to provide a method of generating oxygen for emergency use arranged that, as a means for removing the oxygen bubbles which cling to the catalyst surface, the oxygen bubbles are wiped off directly by a bubble removing member.

DETAILED DESCRIPTION OF THE PREFERRED EMBODIMENTS

Now, preferred embodiments of the method of generating oxygen for emergency use according to the present invention are described below.

Figure 1:
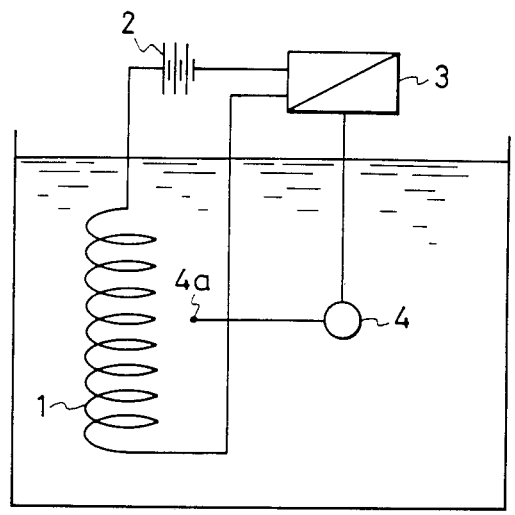
FIG. 1 is a schematic side elevational view of apparatus for carrying out a first embodiment of the present invention.

FIG. 1 shows apparatus for carrying out Embodiment 1 of the present invention. In FIG. 1, numeral 1 designates a coil-shaped catalyst formed by coiling an electrothermal wire, which is covered with an insulation coating, and coating the surface thereof with powder of a catalyst such as manganese dioxide or the like by a method such as binding etc., numeral 2 designates a battery, numeral 3 designates a voltage controller, and numeral 4 designates a temperature sensor having a sensor element 4a which is arranged near the coil-shaped catalyst 1.

In said Embodiment 1, the coil-shaped catalyst 1 is used as the catalyst which is formed into a continuous and integral shape. When said coil-shaped catalyst 1 is put into the aqueous solution which contains the addition compound of sodium carbonate and hydrogen peroxide, oxygen is generated by the chemical reaction described before. When the coil-shpaed catalyst 1 is taken out of the aqueous solution, generation of oxygen stops. As a part of the oxygen generated will from bubbles which cling to the surface of the coil-shaped catalyst 1, the chemical reaction will be sometimes impeded because a coating formed of the bubbles will occur on the catalyst surface. Here, when the electrothermal wire constituting the coil is energized with an electric current, the electrothermal wire generates heat and, therefore, the temperature of the coil-shaped catalyst and aqueous solution around it rises. As a result, a temperature difference occurs between the aqueous solution around the coil-shaped catalyst and the other part of the aqueous solution, and convection is caused in the aqueous solution. As the oxygen bubbles clinging to the surface of the coil-shaped catalyst are carried away by the flow of the aqueous solution caused by said convection and move upward, the catalyst surface comes into direct contact with the aqueous solution and the chemical reaction is continued so that oxygen is thereby generated continuously.

When the temperature of the catalyst surface to be attained by heating of the electrothermal wire is varied here, the temperature difference between the aqueous solution around the catalyst surface and the other part of the aqueous solution varies and, consequently, the degree of convection varies. As the amount of oxygen bubbles to be removed from the catalyst surface also varies according to the state of convection (degree of convection), the degree of the chemical reaction to be performed by the catalyst varies and, therefore, the amount of oxygen to be generated also varies.

When the temperature of the aqueous solution around the catalyst surface is detected by a temperature sensor 4 and the heat generation rate of the electrothermal wire is controlled by the voltage controller 3 so that said temperature is kept constant, it is possible to keep the temperature of the aqueous solution around the catalyst surface approximately constant. Therefore, the oxygen bubbles clinging to the catalyst surface are removed at a constant rate by convection and, consequently, it is possible to generate oxygen always at a constant rate.

Besides, when the temperature of the aqueous solution around the catalyst surface is varied by varying the heat generation rate of the electrothermal wire, the state of convection to be caused by the temperature difference also varies and, therefore, it is possible to increase or decrease the rate of oxygen generation. Furthermore, when the temperature of the aqueous solution around the catalyst surface rises, the dissolving rate of the addition compound of sodium carbonate and hydrogen peroxide increases, and this also increases the rate of oxygen generation. That is, by controlling the temperature of the aqueous solution around the catalyst surface, it is possible to obtain always stable supply of oxygen at a generation rate suitable for the need.

Furthermore, the reaction speed (rate of oxygen generation) varies with the temperature. Besides, when the electrothermal wire is heated at the time of rising (at the beginning) of the chemical reaction, it is possible to make rising (beginning) of oxygen generation smooth and, at the same time, quick.

Figure 2:
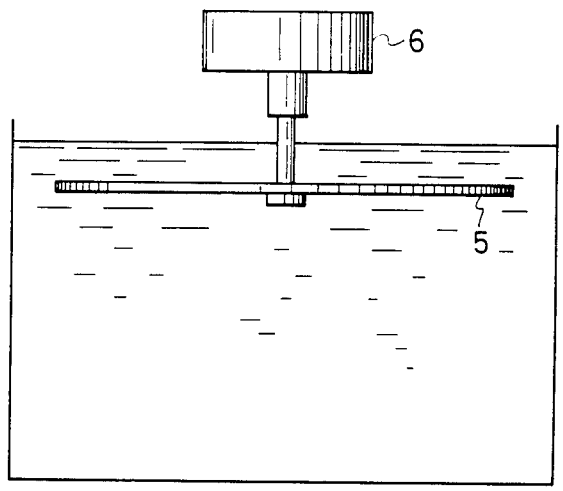
FIG. 2 is a schematic side elevational view of apparatus for carrying out a second embodiment of the present invention.

FIG. 2 shows apparatus for carrying out Embodiment 2 of the present invention. In said Embodiment 2, a plate-shaped catalyst 5 prepared by coating the surface of a disc-shaped body with powder of a catalyst is used as the catalyst which is formed into a continuous and integral shape, and it is arranged to generate oxygen by putting said plate-shaped catalyst 5 into the aqueous solution which contains the addition compound of sodium carbonate and hydrogen peroxide. Besides, the bubbles of oxygen generated which cling to the catalyst 5 are removed by rotating the catalyst 5 by means of a drive motor 6 so that oxygen is thereby obtained always stably at a constant rate.

Also in said Embodiment 2, it is possible to generate oxygen by putting the plate-shaped catalyst 5 into the aqueous solution and to stop generation of oxygen by taking the plate-shaped catalyst 5 out of the aqueous solution. Besides, by varying the rotational speed of the plate-shaped catalyst 5, it is possible to control the rate of removal of oxygen bubbles clinging to the catalyst surface and to thereby control the rate of oxygen generation. Furthermore, it is also possible to use a plural number of plate-shaped catalysts by arranging them in parallel with each other at certain intervals.

Figure 3:
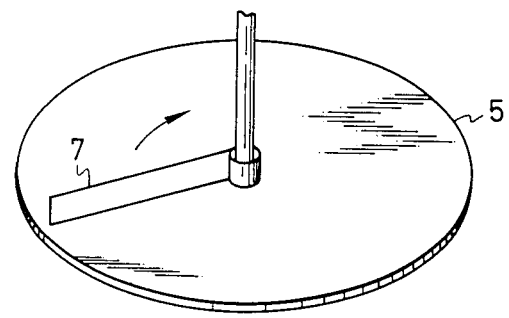
FIG. 3 is a fragmentary perspective view of apparatus for carrying out a third embodiment of the present invention.

FIG. 3 shows apparatus for carrying out Embodiment 3 of the present invention. In said Embodiment 3, a plate-shaped catalyst 5 prepared by coating the surface of a disc-shaped body with powder of a catalyst and having the same shape as the plate-shaped catalyst employed in Embodiment 2 is used as the catalyst formed into a continuous and integral shape. Besides, an oxygen bubble removing member 7 is adopted and arranged so that said member 7 moves so as to gently wipe the surface of the plate-shaped catalyst 5. The oxygen bubble-removing member 7 may be formed as a simple plate-shaped member or, for example, as a brush-shaped member.

Said Embodiment 3 is arranged such that oxygen is generated by putting the plate-shaped catalyst 5 into the aqueous solution so as to make the chemical reaction in the same way as Embodiment 2 and, at the same time, arranged such that oxygen bubbles are removed by moving the oxygen bubble removing member 7 so as to thereby obtain stable generation of oxygen.

Also in Embodiment 3, it is possible to control the rate of oxygen generation by controlling the moving speed of the oxygen bubble-removing member 7 and thereby varying the rate of removal of oxygen bubbles.

Besides respective embodiments shown in the above, it is also possible to remove the oxygen bubbles by providing a stirring member or a vibrating member in the aqueous solution and causing flow of the aqueous solution by means of stirring or vibration. As another method for removing the oxygen bubbles, it is also possible to circulate the aqueous solution by means of a pump.

In cases that the plate-shaped catalyst is used as in Embodiments 2 and 3, it is also possible to control the temperature of the aqueous solution near the catalyst by heating using a heating means so as to control the dissolving rate of the addition compound of sodium carbonate and hydrogen peroxide and to thereby control the rate of oxygen generation. In that case, when a plate-shaped ceramic heater coated with the catalyst is used as the plate-shaped catalyst, it is possible to heat the catalyst directly.

The method of generating oxygen for emergency use according to the present invention is arranged that generation of oxygen is started and stopped by putting the catalyst, which is formed into a continuous and integral matter, into and taking said catalyst out of the aqueous solution containing the addition compound of sodium carbonate and hydrogen peroxide, and said method of generating oxygen makes it possible to interrupt generation of oxygen halfway and to stop generation of oxygen repeatedly. Besides, in the method of generating oxygen for emergency use according to the present invention, it is possible to control the rate of oxygen generation by controlling the rate of removal of oxygen bubbles clinging to the catalyst and, at the same time, it is possible to obtain always stable generation of oxygen. Moreover, it is also possible to control the rate of oxygen generation by controlling the temperature of the aqueous solution near the catalyst surface and thereby controlling the dissolving rate of the addition compound of sodium carbonate and hydrogen peroxide.

We claim:

1. A method for generating oxygen for emergency use, comprising:
   (a) providing an aqueous solution of an addition compound of sodium carbonate and hydrogen peroxide;
   (b) providing an integral catalyst support body having supported on a surface thereof a layer of a catalyst which is capable, when immersed in said solution, of catalysing generation of oxygen gas, at least partly in the form of bubbles which tend to cling to said layer;
   (c) repeatedly immersing said surface of said body in said solution, and withdrawing said surface of said body from said solution so as to repeatedly initiate and terminate catalysed generation of oxygen in said solution;
   (d) while said surface of said body is immersed in said solution, actively dislodging oxygen bubbles from clinging to said layer.

2. The method of claim 1, wherein:
step (d) comprises heating said solution proximally of said layer of catalyst.

3. The method of claim 2, wherein:
the rate of oxygen generated in said method is controlled, at least in part, by varying the temperature of said solution proximally of said layer of catalyst.

4. The method of claim 1, wherein:
step (d) comprises convecting said solution proximally of said layer of catalyst.

5. The method of claim 4, wherein:
the rate of oxygen generated in said method is controlled, at least in part, by varying the temperature of said layer of catalyst.

6. The method of claim 1, wherein:
said integral catalyst support body having supported on a surface thereof a layer of a catalyst is constituted by a coil-shaped metal wire coated with a powdered catalyst.

7. The method of claim 6, wherein:
step (d) comprises heating said wire by applying an electric current thereto.

8. The method of claim 7, wherein:
the rate of oxygen generated in said method is controlled, at least in part, by varying the electric current applied to said wire.

9. The method of claim 1, wherein:
step (d) comprises moving said body relative to said solution.

10. The method of claim 9, wherein:
said body is moved by rotating it.

11. The method of claim 9, wherein:
said body is moved by vibrating it.

12. The method of claim 1, wherein:
said integral catalyst support body having supported on a surface thereof a layer of a catalyst is constituted by at least one plate-shaped member coated with a powdered catalyst.

13. The method of claim 12, wherein:
step (d) comprises moving said body relative to said solution.

14. The method of claim 13, wherein:
said body is moved by rotating it.

15. The method of claim 13, wherein:
said body is moved by vibrating it.

16. The method of claim 12, wherein:
said at least one plate-shaped member is a ceramic heater and step (d) comprises heating said ceramic heater.

17. The method of claim 1, wherein:
step (d) comprises agitating said solution.

18. The method of claim 1, wherein:
step (d) comprises pumping said solution so as to establish fluid flow currents therein.

19. The method of claim 1, wherein:
step (d) comprises physically wiping said layer.

* * * * *